(12) United States Patent
Redele

(10) Patent No.: US 6,533,491 B1
(45) Date of Patent: Mar. 18, 2003

(54) BALL JOINT FOR MOTOR VEHICLE STEERING

(75) Inventor: Jean Redele, Paris (FR)

(73) Assignee: Scoma, La Loupe (FR)

( * ) Notice: Subject to any disclaimer, the term of this patent is extended or adjusted under 35 U.S.C. 154(b) by 0 days.

(21) Appl. No.: 09/582,654

(22) PCT Filed: Dec. 30, 1998

(86) PCT No.: PCT/FR98/02915
§ 371 (c)(1),
(2), (4) Date: Dec. 5, 2000

(87) PCT Pub. No.: WO99/35020
PCT Pub. Date: Jul. 15, 1999

(30) Foreign Application Priority Data

Dec. 31, 1997 (FR) ............................................. 97 16769

(51) Int. Cl.⁷ ......................... F16C 11/06; G01D 21/00
(52) U.S. Cl. ......................................... 403/138; 403/27
(58) Field of Search ................................... 403/27, 138

(56) References Cited

U.S. PATENT DOCUMENTS

| | | | | |
|---|---|---|---|---|
| 3,791,748 A | * | 2/1974 | Goodrich, Jr. et al. .......... | 403/27 |
| 3,813,178 A | * | 5/1974 | Herbenar et al. .............. | 403/27 |
| 3,817,640 A | * | 6/1974 | Carter et al. ................. | 403/138 |
| 3,845,735 A | * | 11/1974 | Bossler, Jr. .................. | 403/27 |
| 3,890,052 A | * | 6/1975 | Herbenar et al. .............. | 403/27 |
| 3,960,457 A | * | 6/1976 | Gaines et al. ................ | 403/27 |
| 4,017,197 A | * | 4/1977 | Farrant ........................ | 403/27 |
| 4,070,121 A | * | 1/1978 | Graham ....................... | 403/27 |
| 4,111,571 A | * | 9/1978 | Farrant ........................ | 403/27 |
| 4,358,211 A | * | 11/1982 | Goodrich, Jr. et al. ......... | 403/27 |
| 4,576,499 A | * | 3/1986 | Smith .......................... | 403/27 |
| 4,626,121 A | * | 12/1986 | Tajima ........................ | 403/27 |
| 4,749,299 A | * | 6/1988 | Swanson ...................... | 403/27 |
| 6,152,637 A | * | 11/2000 | Maughan ..................... | 403/27 |

FOREIGN PATENT DOCUMENTS

| | | |
|---|---|---|
| FR | 2 560 140 | 4/1985 |
| GB | 1 336 087 | 11/1973 |

* cited by examiner

*Primary Examiner*—Lynne H. Browne
*Assistant Examiner*—Ernesto Garcia
(74) *Attorney, Agent, or Firm*—Sughrue Mion, PLLC

(57) ABSTRACT

The invention concerns a ball joint, in particular for motor vehicle steering, comprising a housing (1), a spherical mounting (2) engaged inside the housing, formed by a spherical mounting head integral (20) with a rod (2a) emerging through an opening (16) of the housing, a lower bearing (3) defining a lower supporting surface enclosing the spherical head on the housing opening side and an opposite upper mobile bearing (24) defining an upper supporting surface, said upper bearing being urged by spring (5) against the, spherical mounting head (20), so as to be able to move towards the lower bearing (24) while the spherical mounting head (20) or the lower bearing wears away, wear indicating means (7, 7', 7") being adapted to provide information concerning wear according to the movement of said upper mobile bearing (24) or of the head.

9 Claims, 3 Drawing Sheets

BALL JOINT FOR MOTOR VEHICLE STEERING

The present invention relates to a pivot joint for use particularly in automobile steering systems. "Automobile" is understood to include cars, trucks and tractors as well as any type of industrial vehicle such as a works vehicle. Although the pivot joint of the present invention has widespread use in this application, it will be understood that such a pivot joint can be used for other applications without going outside the scope of the invention.

It is known that pivot joints may be subjected to significant stress and that they must be totally reliable, particularly when used in automobile steering systems. High quality parts are therefore needed. The resulting high material and production costs are reflected in the selling price.

This type of pivot joint is particularly disclosed in French patent FR 2,560,140. The joint essentially comprises a housing with a housing shank made as a single part, a pivot that has a head mounted within an opening in the housing, upper and lower bushings, a spring that presses the upper bushing against the head of the pivot and hence against the lower bushing.

Although the bushings are described as "upper" and "lower", it is clear that this labeling is arbitrary and refers to their relative positions in the drawing; the names are only for convenience in describing the invention.

An inevitable problem with this type of pivot joint is the wear due to friction between the head of the pivot and/or the lower bushing. Indeed, in operation the pivot head rotates inside the housing formed by the bushings. There is therefore virtually imperceptible but continuous abrasion that wears away the head of the pivot and/or the lower bushing to the point where the pivot is no longer spherical. The loss of material gives rise to play that is fortunately directly compensated for when the upper bushing is activated by the spring. The upper bushing therefore acts to make up the play as the head of the pivot and/or the lower bushing are worn away. This type of wear is thus a well known problem. But in practice the state of wear is not easy to check. A very simple technique used by engineers consists in grasping the shaft on which the joint head is mounted and moving it so that the head moves in its housing. However, it is very difficult to establish the state of wear of the head by using this purely empirical technique since it is difficult to establish whether there is in fact play in the head or whether the head moving in its housing is due to the upper bushing moving against its spring. It is therefore very tricky to establish whether a pivot joint is still fit for use. This type of pivot joint can often be in an unacceptable state of wear that can cause an accident; conversely, pivot joints are often replaced when they are still perfectly capable of functioning.

British patent GB 1,336,087 discloses a pivot joint the upper bushing of which comprises a greasing unit consisting of a bush 38 that projects from the housing of the pivot. This bushing is pressed elastically against the head of the pivot by a compressed elastomer ring. This ring bears both on the movable upper bushing and a fixed cover 28. The cover is pierced by an aperture 40 through which the bush 38 of the bushing projects. Consequently as the head of the pivot wears away, the bush is pushed into the aperture, thereby giving an indication of the wear on the head and/or the lower bushing.

The design of this pivot joint is outmoded as it requires greasing. Modern pivot joints are permanently lubricated and require no greasing unit. As the fixed cover 28 serves to seal the housing, the presence of an aperture would be harmful.

The present invention aims to overcome this drawback in the prior art by disclosing a pivot joint of modern design for which it is very easy to determine whether it is still capable of fulfilling its function.

To do this, a first embodiment of the present invention proposes a pivot joint, particularly intended for automobile steering systems, that comprises a housing and a pivot head lodged inside said housing, said pivot head consisting of a spherical head constructed as part of a shank that projects through an aperture in the housing, a lower bushing that forms a lower bearing seat enclosing the head of the pivot on the open side of the housing and an opposite movable upper bushing that forms an upper bearing seat, said upper bushing being pressed by a spring against the head of the pivot so that it is moved towards the lower bushing as the pivot head wears, said pivot joint comprising means for indicating the wear of the head of the pivot capable of giving an indication of the wear of said head relative to the movement of said upper movable bushing, said wear indicator means comprising a contact component capable of coming into contact with a part of said upper movable bushing, the contact component being disposed in the path of translational movement of said upper bushing towards said lower bushing.

Given that it is difficult to measure the wear on the head of the pivot directly in terms of the reduction of its radial diameter, it was necessary to use a parameter that was dependent on this wear but which was easier to determine. By using the displacement of the upper bushing it was possible to replace a radial magnitude by an axial magnitude that is easier to measure.

In a second embodiment, the invention proposes a pivot joint, particularly intended for automobile steering systems, that comprises a housing and a pivot head lodged inside said housing, said pivot head consisting of a spherical head constructed as part of a shank that projects through an aperture in the housing, a lower bushing that forms a lower bearing seat enclosing the head of the pivot on the open side of the housing and an opposite movable upper bushing that forms an upper bearing seat, said upper bushing being pressed by a spring against the head of the pivot so that it is moved towards the lower bushing as the lower bushing wears, said pivot joint comprising means for indicating the wear of the lower bushing capable of indicating the wear of the said bushing, said wear indicator means comprising a contact component capable of coming into contact with head of the pivot activated by the spring.

The same principle is used in this embodiment, i.e. a component is positioned in the displacement path of a component of the joint that moves under the effect of wear. In this embodiment, which applies more particularly to joints subject to wear on the lower bushing, it is the head of the pivot that constitutes the movable component designed to come into contact with the contact component of the wear indicator means. It is clear that this second embodiment would be inefficient for joints in which the lower bushing does not wear.

In a first type of embodiment the indicator means provide an electrical indication that can be displayed as an indicator lamp.

In a second type of embodiment the indicator means provide a discrete visual indication that represents a value of the acceptable limit of wear.

In another version, the indicator means give a continuous visual display that represents the progressive wear of the head.

Advantageously the contact component is fastened to a component that conducts electricity and is capable of establishing an electrical contact when the contact component is activated by the head or the upper bushing.

In a second type of embodiment the contact component comprises the surface of a cam designed to slide against part of the upper bushing, thereby causing the said contact component to move in translation in a direction perpendicular to the direction of displacement of said upper bushing.

In a third type of embodiment the contact component comprises an endpiece designed to break under the effect of the said upper bushing or head, said endpiece being connected to a shank, a spring drawing said shank away from said endpiece such that the breakage of said component frees said shank.

In another type of embodiment the said contact component is maintained in the path of displacement of the upper bushing or the head by a connection designed to break when it comes into contact with the upper bushing or the head.

Other characteristics of the present invention will be better understood from the following description of a non-limitative example. The description refers to the attached figures and will make it clear how the invention may be embodied.

Figure 1:
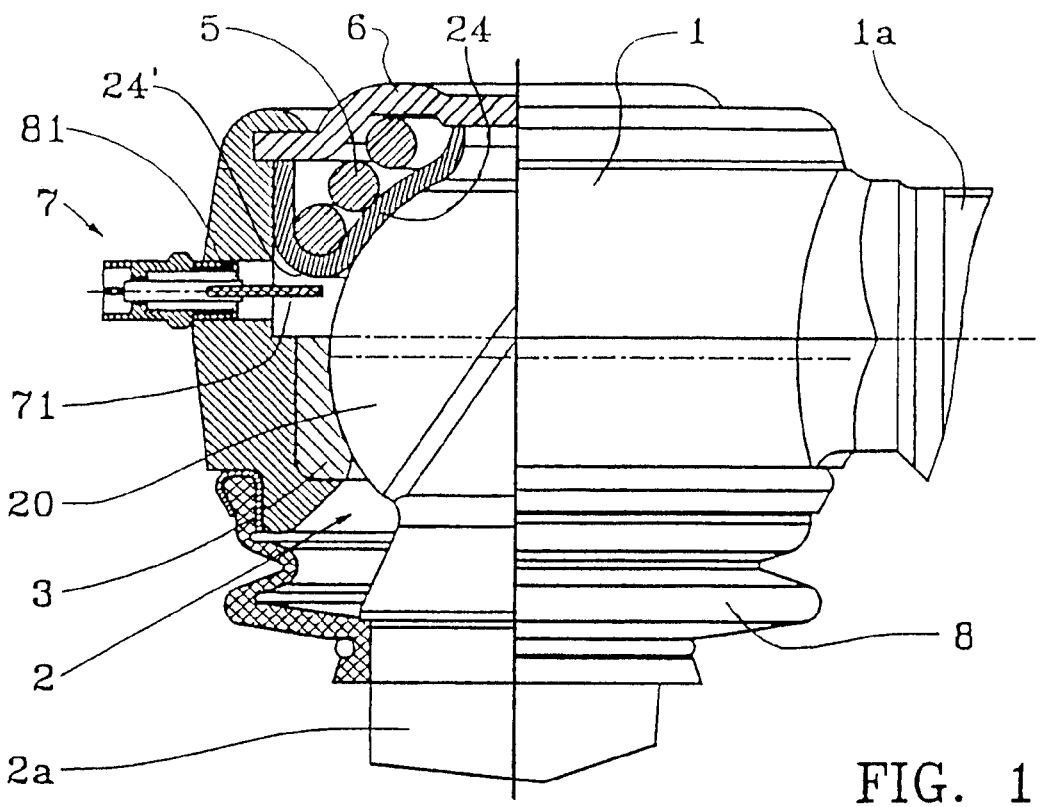
FIG. 1 is a cross-section through the left-hand half and a perspective view of the right-hand half of a pivot joint according to one embodiment of the invention; the pivot joint in this drawing is new.
Figure 2:
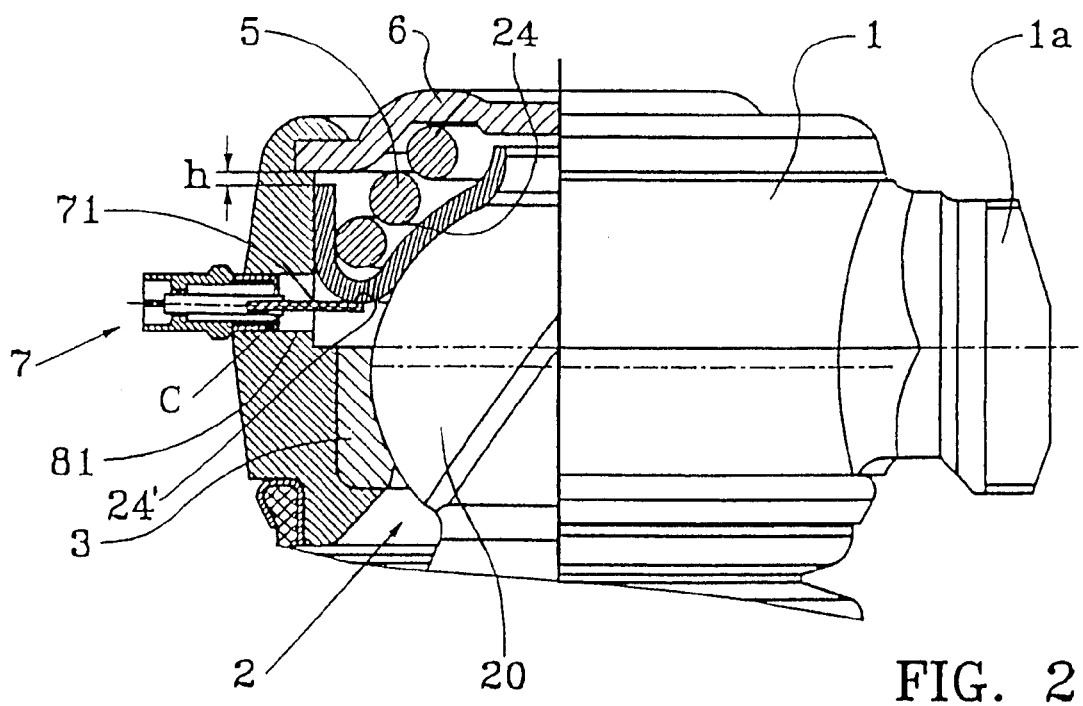
FIG. 2 shows a view of the pivot joint of FIG. 1 in an advanced state of wear.

The pivot joint shown in FIGS. 1 and 2 comprises a housing 1 with a housing shank 1a and a pivot 2 the spherical head of which 20 is housed inside the housing and the shank of which 2a projects through an aperture in the housing. The housing contains a lower bushing 3 that has a hollow spherical surface designed to receive spherical head 20 of the pivot and an outer surface designed to be wedged inside the housing on the side in which the aperture has been cut. Upper bushing 24 is held against spherical head 20 of the pivot by spring 5 which also presses against a plug 6 crimped into the housing.

In FIGS. 1 and 2 upper bushing 24 may therefore be moved downwards by the spring as spherical head 20 of the pivot wears. Bushing 24 and its associated spring combine to constitute a system that takes up the play such that the spherical head of the pivot is always firmly held in the housing. Clearly other devices can be used to take up the play, as will be seen below with reference to FIG. 6.

The pivot joint in FIG. 1 is new, the head 20 being perfectly spherical. In this state upper bushing 24 is pressed by spherical head 20 against the plug 6. In this state spring 5 fills no function. However, as can be seen in FIG. 2, when head 2 of the pivot is worn, spring 5 continues to press bushing 24 against the head and it will be seen that bushing 24 is displaced downwards by distance h. This measurement of displacement of upper bushing 24 is directly representative of the state of wear of head 20 of the pivot.

Figure 3:
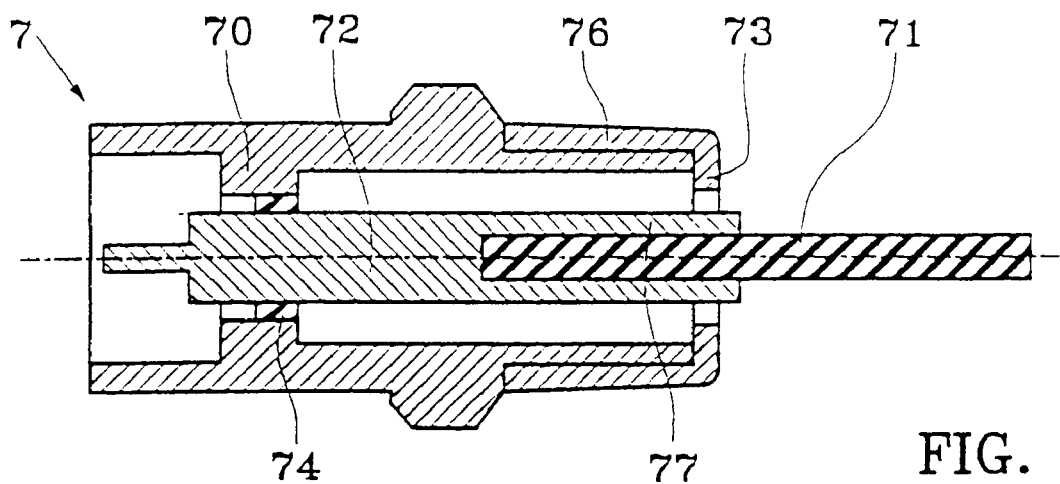
FIG. 3 is a transverse section through the wear indicator means used in the present invention.

According to the invention, this state of wear of head 20 of the pivot is detected by wear indicator means that are given the overall number 7. In the embodiment shown in FIGS. 1 and 2, wear indicator means 7 are disposed on the housing 1 of the joint at a point located more or less between upper bushing 24 and lower bushing 3. This may, for example, be achieved by providing a threaded hole 81 in the wall of housing 1 such that the inside and outside of the housing can communicate. The wear indicator means 7 can then simply be screwed into hole 81. Turning now to FIG. 3 which shows an enlargement of the wear indicator means of FIGS. 1 and 2, it will be seen that the device comprises a more or less cylindrical body 70 that includes a threaded section 76 designed to fit the internal thread of hole 81 in housing 1. Wear indicator means 7 also comprises a contact component 71 comprising a shank which in this assembled state passes underneath upper bushing 24 as shown in FIG. 1. Contact shank 71 is made of a non-conducting material but housed in a sleeve 72 that is made of a conducting material. Sleeve 72 is retained in body 70 by an insulating/retaining ring 74 made of a flexible material. It will be easily understood that sleeve 72 can be displaced inside body 70 by moving contact shank 71 out of its axis such that the end 77 of sleeve 72 comes into contact with the end 73 of body 70 that is also made of an electrically conducting material. When body 70 and sleeve 72 are connected to a power supply, contact between body 70 and sleeve 72 closes the circuit thereby making contact. Thus any movement of contact shank 71 out of its axis causes an electrical contact to be established between sleeve 72 and body 70. If an indicator lamp is included in the circuit it is easy to see that there has been contact between these two components. By accurately locating hole 81 in housing 1 it becomes possible accurately to adjust the position of contact shank 71 relative to an upper bushing 24 as shown in FIG. 1. In the new state shown in FIG. 1, the contact shank 71 is not in contact with upper bushing 24. As the spherical head becomes worn upper bushing 24 descends towards lower bushing 3, getting closer to the contact shank 71. Once contact has been established between a part 24' of bushing 24 and contact shank 71, the bushing 24 acts to push contact shank 71 downwards, eventually causing contact to be established between sleeve 72 and body 70. The distance over which upper bushing 24 is then displaced is the distance h shown in FIG. 2. The value of distance h must be accurately determined and must represent the acceptable limit of the state of wear of spherical head 20. The value of this distance h may be determined empirically. Therefore as soon as upper bushing 24 has been moved by distance h, electrical contact is established and the indicator lamp (not shown) lights up, thereby indicating that the spherical head 20 of the pivot has reached the limit of wear. By consulting the dashboard of the vehicle on which the indicator lamp is mounted, the vehicle user knows that it is time to change the pivot joint in question.

Figure 4:
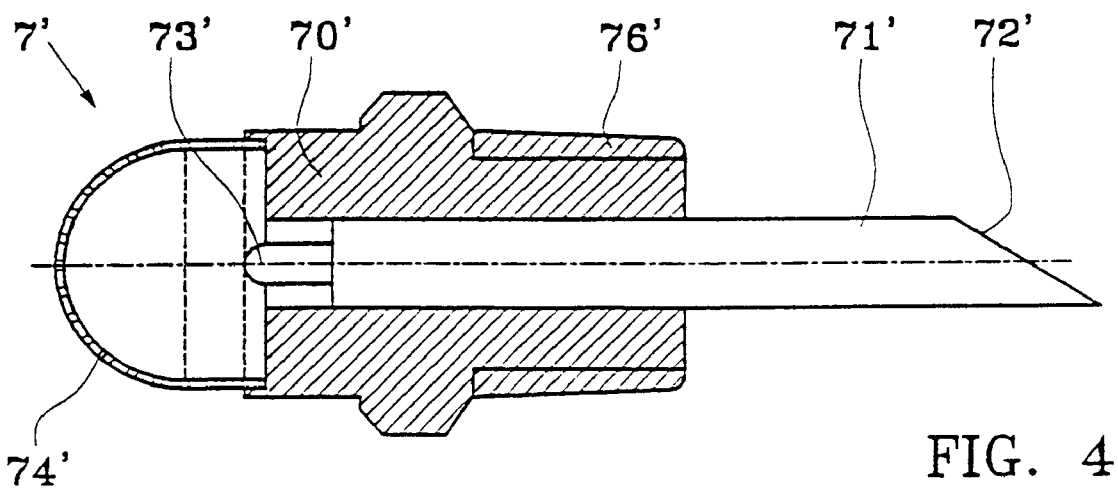
FIG. 4 is a transverse cross-section through second wear indicator means used in the present invention.
Figure 5:
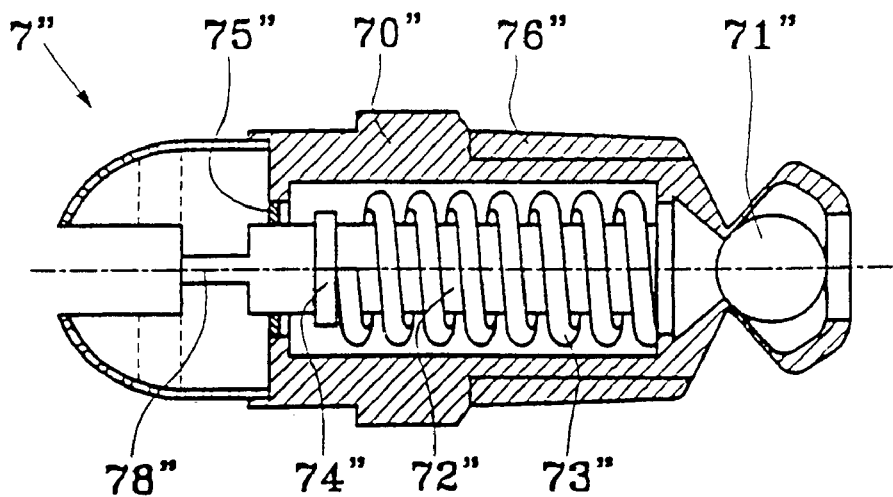
FIG. 5 is a transverse cross-section through a third embodiment of a wear indicator used in the present invention.

The wear indicator device 7 described above thus indicates that the spherical head 20 of the pivot has reached an acceptable limit of wear. This value has not been detected directly but rather deducted from a parameter directly related to the state of wear, namely the translational displacement of upper bushing 24 that acts to take up the play. The position of the wear indicator device 7 described above should not be considered the only one possible. It is entirely possible to use other types of wear indicator that are positioned at other points on the pivot joint. For example it is possible to fit a window in plug 6 in order to observe the displacement of bushing 24 relative to a graduated scale. FIGS. 4 and 5 show other types of embodiment of the wear indicator device and may be used to replace that shown in FIGS. 1, 2 and 3.

In FIG. 4 the wear indicator device is a device that gives a continuous visual indication of the progressive wear of the spherical head relative to the displacement of bushing 24. To achieve this, device 7' comprises a body 70 that also includes a threaded section 76' designed to screw into hole 81 in housing 1. Body 70 contains a cylindrical passage in which contact component 71' slides freely. The end of shank 71' that is located inside the housing is provided with a sloped cam surface 72' designed to come into contact with the lower section of upper bushing 24. Because contact shank 71' can slide freely inside body 70', the downward movement of upper bushing 24 against slope 72' causes therefore contact shank 71' to move inside body 70'. The other end of shank 71' is fitted with a display attachment 73' which indicates how far contact shank 71' has moved inside body 70'. In order to protect display attachment 73' and contact shank 71' from dirt, the outer section of body 70' is fitted with a transparent plastic dome 74'. Using device 7' it is therefore possible to obtain a continuous indication of the progressive state of wear of spherical head 20.

Turning now to FIG. 5, wear indicator device 7" acts as both a visual and electrical indicator. Indeed, device 7" also has a body 70" similar to those of device 7 and 7' and thus has an outer threaded section 76". At the end of body 70' that is located inside housing 1, the body forms a breakable endpiece 71" that is designed to be broken by bushing 24 as it moves downwards towards its opposite lower bushing 3. Said pivot endpiece 71" is initially constructed as part of shank 72" that is forced outwards, i.e. away from breakable endpiece 71", by a spring 73". In addition, shank 72" is fitted with a stop ring 74" designed such that once breakable endpiece 71" has broken, it presses against a stop ring 75" formed by body 70". The free end of shank 72" that lies outside the body is fitted with a pin 78" that can be seen from the outside. Thus as soon as upper bushing 24 has broken breakable endpiece 71", shank 72" is forced by spring 73" until its stop ring 74" comes into contact with stop component 75". When these two components come into contact, they establish an electrical contact like that of device 7 in FIG. 3 that may, for example, cause a lamp on the vehicle dashboard to light up. It can also directly be seen by observing the position of pin 78' whether breakable endpiece 71" is still in position. This wear indicator device is thus both visual and electric.

It will therefore be understood that the particular type of wear indicator device used does not limit the scope of the invention. All that is required is for the indicator to give an indication of the state of wear of spherical head 20 of the pivot which is made easier by measuring a parameter that is directly dependent on this state of wear such as the displacement of upper bushing 24.

Figure 6:
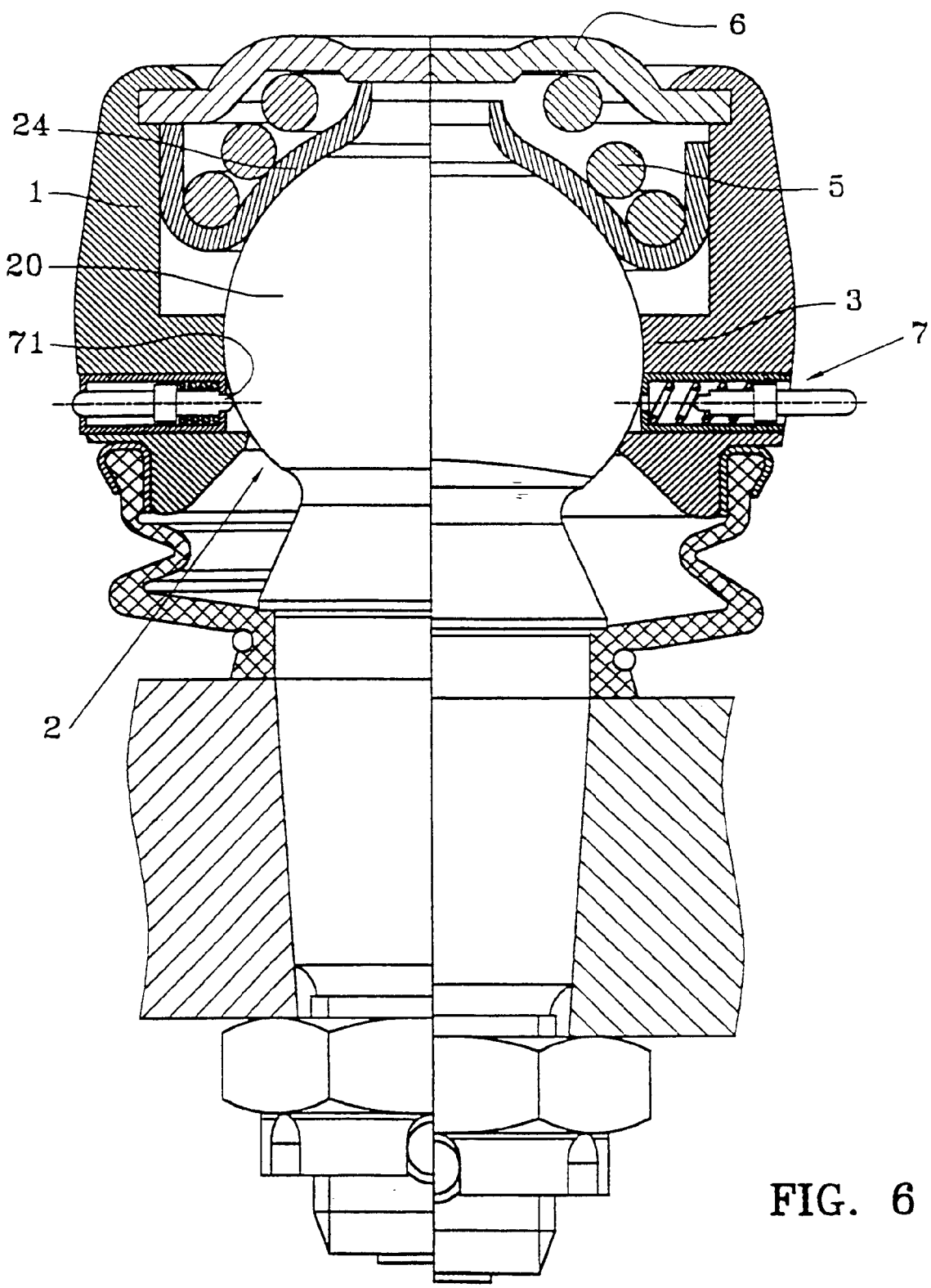
FIG. 6 is a cross-section through a pivot joint according to a second embodiment of the invention.

FIG. 6 shows a joint constructed according to a second type of embodiment. The components used to construct this embodiment are identical to those of FIGS. 1 and 2 except that lower bushing 3 is an integral part of housing 1 and wear indicator device 7 is installed on the lower bushing. The contact component is therefore designed to come into contact with the head 20 of the pivot as the lower bushing wears. Indeed, this type of embodiment is particularly, but not exclusively, suitable for joints that are subject to wear of the lower bushing. The head of the pivot may also be subject to wear. The contact component must be positioned below the maximum diameter of the head so that the head may come into contact with the contact component. The indicator used may be of the type shown in FIGS. 3 to 5 or of some other type.

The principle remains identical and the same indicating devices may be used irrespective of whether the contact is made with the upper bushing or the pivot head.

What is claimed is:

1. Pivot joint, comprising a housing (1) and a pivot (2) lodged inside said housing, said pivot comprising a spherical head (20) connected to a shank (2a) that projects through an aperture (16) in the housing, a lower bushing (3) that forms a lower bearing seat enclosing the head of the pivot on the open side of the housing and an opposite movable upper bushing (24) that forms an upper bearing seat, said upper bushing being pressed by a spring (5) against the head (20) of the pivot so that said upper bushing is movable towards the lower bushing (3) as the pivot head (20) wears, said pivot joint further comprising means (7, 7', 7") for indicating wear of the head (20) of the pivot capable of giving an indication of the wear of said head (20) relative to movement of said movable upper bushing (24), characterized in that said means (7, 7', 7") for indicating wear comprise a contact component (71, 71', 71") capable of coming into contact with a part of said movable upper bushing (24), said contact component (71, 71', 72") being disposed between the lower bushing (3) and the upper bushing (24) in a path of translational movement of said upper bushing (24) towards said lower bushing (3).

2. Pivot joint of claim 1 wherein said means for indicting wear triggers an electrical signal that is displayed by an indicator lamp.

3. Pivot joint of claim 1, wherein said indicator means (7, 7") provide a discrete visual indication that represents a value of the acceptable limit of wear.

4. Pivot joint of claim 1, wherein said indicator means (7') give a continuous visual indication that represents the progressive wear of the head.

5. Pivot joint of claim 1 wherein said contact component (71) is constructed as part of a component (72) that conducts electricity and is capable of establishing an electrical contact when activated by said contact component (71).

6. Pivot joint of claim 1 wherein said contact component (71') comprises a cam surface (72') designed to slide against the upper bushing (24), thereby causing the said contact component (71') to move in translation in a direction perpendicular to the direction of displacement of said upper bushing (24).

7. Pivot joint of claim 1 wherein said contact component comprises an endpiece (71") designed to break under the effect of said upper bushing (24) or head (20), said endpiece (71") being connected to a shank (72"), a spring (73") drawing said shank away from said endpiece (71") such that the breakage of said component frees said shank (72").

8. Pivot joint of claim 1 wherein said contact component (71) is maintained in the path of displacement of the upper bushing or the head by a connection designed to break when contact component (71) comes into contact with the upper bushing.

9. A pivot joint, comprising a housing and a pivot lodged inside said housing, said pivot comprising a spherical head connected to a shank that projects through an aperture in the housing, a lower bushing that forms a lower bearing seat enclosing the head of the pivot on the open side of the housing and an opposite movable upper bushing that forms an upper bearing seat, said upper bushing being pressed by a spring against the head of the pivot so that said upper bushing is movable towards the lower bushing as the pivot head wears, said pivot joint further comprising a wear indicator capable of giving an indication of the wear of said head relative to movement of said movable upper bushing, said wear indicator comprising a contact component capable of coming into contact with a part of said movable upper bushing, said contact component being disposed between the lower bushing and the upper bushing in a path of translational movement of said upper bushing towards said lower bushing.

* * * * *